United States Patent [19]

Marubashi

[11] 4,205,150
[45] May 27, 1980

[54] THERMO-REVERSIBLE ELASTOMER COMPOSITION COMPRISING A LIQUID CHLOROPRENE POLYMER AND A POLYVALENT METAL OXIDE OR HYDROXIDE

[75] Inventor: Kiyonobu Marubashi, Ohmi, Japan

[73] Assignee: Denki Kagaku Kogyo Kabushiki Kaisha, Tokyo, Japan

[21] Appl. No.: 894,952

[22] Filed: Apr. 10, 1978

[51] Int. Cl.$^2$ .................... C08F 36/16; C08F 236/16; C08G 79/10
[52] U.S. Cl. .................... 526/252; 526/75; 526/209; 526/214; 526/240; 526/265; 526/273; 526/292; 526/293; 526/294; 525/327; 525/328; 525/329; 525/330; 525/331; 528/392; 528/393; 525/368; 525/369; 525/370; 525/373
[58] Field of Search ............... 526/11.1, 214, 17, 273, 526/292, 294, 265, 293, 75, 240, 47.8, 47.9, 48.4; 528/392, 393, 9, 360

[56] References Cited

U.S. PATENT DOCUMENTS

| | | | |
|---|---|---|---|
| 2,259,122 | 10/1941 | Walker | 526/214 |
| 3,208,980 | 9/1965 | Gruver et al. | 526/11.2 |
| 3,264,273 | 8/1966 | Greenlee | 528/360 |
| 3,278,496 | 10/1966 | Fave et al. | 528/360 |
| 3,388,109 | 6/1968 | Hawkins et al. | 526/214 |
| 3,817,946 | 6/1974 | Ree | 526/214 |
| 3,846,390 | 11/1974 | Ito et al. | 526/214 |
| 3,919,281 | 11/1975 | Marubashi et al. | 260/455 B |
| 4,022,725 | 5/1977 | Rinse | 528/9 |

FOREIGN PATENT DOCUMENTS

| | | | |
|---|---|---|---|
| 497638 | 12/1938 | United Kingdom | 526/214 |
| 538120 | 7/1941 | United Kingdom | 528/360 |
| 161922 | 5/1964 | U.S.S.R. | 528/9 |

*Primary Examiner*—Joseph L. Schafer
*Assistant Examiner*—Herbert S. Lilling
*Attorney, Agent, or Firm*—Sughrue, Rothwell, Mion, Zinn and Macpeak

[57] ABSTRACT

A liquid chloroprene polymer having substantially at least one carboxyl group in the molecule and having a number average molecular weight of about 500 to about 20,000 which is produced by (1) homopolymerizing a chloroprene monomer or
(2) copolymerizing a chloroprene monomer with a monomer copolymerizable with a chloroprene monomer, in the presence of an organic solvent and about 0.5 to about 20 parts by weight of a mercaptocarboxylic acid per 100 parts by weight of the monomers. The liquid polymer is reacted with a polyvalent metal oxide or hydroxide to form a thermo-reversible elastomeric composition.

16 Claims, No Drawings

THERMO-REVERSIBLE ELASTOMER COMPOSITION COMPRISING A LIQUID CHLOROPRENE POLYMER AND A POLYVALENT METAL OXIDE OR HYDROXIDE

BACKGROUND OF THE INVENTION

1. Field of the Invention

This invention relates to a liquid chloroprene polymer having a terminal carboxyl group and to a process for the production thereof.

2. Description of the Prior Art

A liquid chloroprene polymer having an active terminal group is a material useful in various fields. Polymers having terminal mercapto groups (e.g., as disclosed in U.S. Pat. No. 3,700,645) and polymers having terminal xanthate groups (e.g., as disclosed in U.S. Pat. Nos. 3,919,281 and 4,051,731, etc.) are known. U.S. Pat. No. 3,969,326 also discloses carboxyl terminated polychloroprene produced by polymerizing chloroprene in the presence of a peroxide initiator having 2 carboxyl groups. These chloroprene polymers are cured with a curing agent such as an amine to provide a rubbery elastomer. The mechanism of curing involves a so-called vulcanization reaction, and the rubbery elastomer, once cured, can no longer be restored to a highly fluid liquid form.

However, the current trend toward expanding the scope of applications and the need for a clean environment in the industrial production and use of adhesives, sealing materials, paints, etc. demands a novel material which is a solvent-free hot-melt elastomer that has sufficient thermo-reversibility that a fluidic liquid form results when the material is hot-melted.

SUMMARY OF THE INVENTION

An object of the invention is to provide a novel liquid chloroprene polymer and a process for preparing thereof. The liquid chloroprene polymer provided by this invention forms a chelate with a metal compound and, when heated, the chelate breaks and the solidified polymer hot-melts and turns liquid. Certain of these polymers can be heat-cured upon further heating.

The liquid chloroprene polymer according to this invention has substantially one or more carboxyl groups in the molecule and has a number average molecular weight within the range of from about 500 to about 20,000. The liquid polymer is capable of being solidified to provide an elastomer by forming a chelate with a metal compound, preferably a polyvalent metal oxide. Chelate formation occurs at a temperature ranging from room temperature to about 70° C., with the result that the entire polymer is solidified, but at a temperature higher than 80° C., the chelate breaks and the solidified polymer hot-melts and reverts to a liquid form. Of the liquid chloroprene polymers according to this invention, those which do not have an appreciably low molecular weight, or those having a number average molecular weight higher than about 1,000, are capable of forming a thermo-irreversible rubbery elastomer which is vulcanized if it is further heated in the presence of a polyvalent metal oxide, preferably, magnesium oxide or zinc oxide.

The liquid chloroprene polymer of this invention can be produced by homopolymerizing a chloroprene monomer or copolymerizing a chloroprene monomer with a monomer copolymerizable therewith in the presence of an organic solvent and about 0.5 to about 20 parts by weight of mercaptocarboxylic acid per 100 parts by weight of the monomers.

DETAILED DESCRIPTION OF THE INVENTION

Suitable examples of monomers copolymerizable with chloroprene monomer are those monomers having an

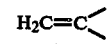

group and preferred specific examples of these copolymerizable monomers are styrene and styrene derivatives such as, 2-, 3-, and 4-chlorostyrene, 2-, 3-, and 4-bromostyrene, 3-chloro-2-methylstyrene, 2,3-dichlorostyrene, 2,4-dimethylstyrene, 2-, 3- and 4-methoxystyrene and 2-, 3- and 4-ethoxystyrene, etc.; vinylpyridine derivatives such as 2-, 3- and 4-vinylpyridine, 5-ethylene-2-vinylpyridine and 2-methyl-5-vinylpyridine, etc.; acrylic acid esters such as methyl methacrylate, ethyl methacrylate, methyl acrylate, ethyl acrylate, butyl acrylate, butyl methacrylate, etc.; unsaturated glycidyl esters; polyfunctional acrylates or methacrylates, unsaturated carboxylic acids; unsaturated nitriles such as acrylonitrile; and diene monomers such as isoprene, butadiene-1,3, 2,3-dimethylbutadiene, 1-chlorobutadiene-1,3, 2,3-dichlorobutadiene-1,3, 2-bromobutadiene-1,3, 2-fluorobutadiene-1,3, 2-cyanobutadiene-1,3, 2-phenylbutadiene-1,3, and 2-chloro-3-methylbutadiene-1,3, etc.

Of these copolymerizable monomers, (a) unsaturated glycidyl esters represented by the formula:

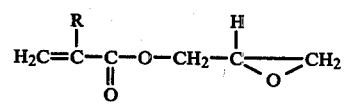

wherein R is a hydrogen atom, a methyl group or an ethyl group, (b) polyfunctional acrylates or polyfunctional methacrylates, and (c) unsaturated carboxylic acids are particularly preferred because the copolymer obtained by copolymerizing these monomers with a chloroprene monomer contains useful functional groups. That is, an unsaturated glycidyl ester introduces an epoxy group into the copolymer, a polyfunctional acrylate or polyfunctional methacrylate introduces an acrylate or methacrylate group into the copolymer, and an unsaturated carboxylic acid introduces a carboxyl group into the copolymer; therefore, a suitable copolymerizable monomer can be selected depending upon the desired object.

Preferred polyfunctional acrylates or methacrylates are difunctional, trifunctional or tetrafunctional acrylates or methacrylates, each represented by one of the following formulae:

Difunctional:

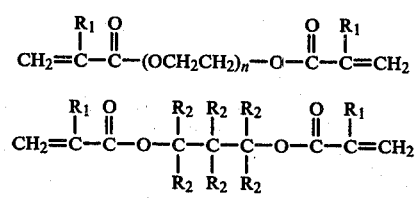

-continued

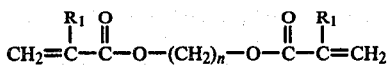

Trifunctional:

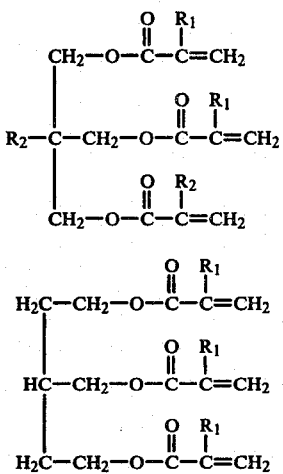

Tetrafunctional:

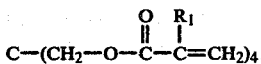

In each of the above formulae, $R_1$ is a hydrogen atom or an alkyl group (e.g., an alkyl group having 1 to 12 carbon atoms such as a methyl group, an ethyl group, a propyl group, a butyl group, a lauryl group, etc.), $R_2$ is a hydrogen atom, an alkyl group (e.g., an alkyl group having 1 to 12 carbon atoms such as a methyl group, an ethyl group, a propyl group, a butyl group, a lauryl group, etc.), a haloalkyl group (e.g., a haloalkyl group having 1 to 12 carbon atoms in which the halogen is F, Cl, Br and I, such as a chloromethyl group, a trichloromethyl group, a bromoethyl group, a dibromoethyl group, etc.), a halogen atom (e.g., a halogen atom, such as F, Cl, Br and I), or a hydroxyalkyl group (e.g., a hydroxyalkyl group having 1 to 12 carbon atoms such as a hydroxymethyl group, a hydroxyethyl group, a hydroxypropyl group, etc.), and n is an integer of 1 to 20.

Typical examples of difunctional acrylate or methacrylate monomers are ethylene glycol dimethyacrylate, triethylene glycol dimethacrylate, tetraethylene glycol dimethacrylate, polyethylene glycol dimethacrylate (wherein the polyethylene glycol usually has a molecular weight of less than about 200), 1,4-butanediol diacrylate, 1,3-butylene glycol dimethyacrylate, 1,3-butylene glycol diacrylate, 1,6-hexanediol diacrylate; typical examples of trifunctional acrylate or methacrylate monomers are trimethylolpropane trimethacrylate and trimethylolpropane triacrylate; and typical examples of tetrafunctional acrylate or methacrylate monomers are pentaerythritol tetraacrylate and pentaerythritol tetramethacrylate.

Preferred unsaturated carboxylic acids are acrylic acid, methacrylic acid, itaconic acid, crotonic acid and vinylacetic acid. The use of unsaturated carboxylic acids as a monomer copolymerizable with the chloroprene monomer leads a liquid polymer which has an increased carboxyl group content.

The use of 2,3-dichlorobutadiene-1,3 or isoprene is especially effective in retaining fluidity of the polymer to a sufficient extent during storage.

In copolymerizing a chloroprene monomer with a monomer copolymerizable therewith, the amount of the copolymerizable monomer is usually less than 50% by weight, preferably 1 to 30% by weight, and most preferably 1 to 20% by weight, based on the total weight of the monomers.

The mercaptocarboxylic acid to be used in this invention serves as a chain transfer agent and has at least one mercapto group and at least one carboxyl group in the molecule. Any mercaptocarboxylic acid can be used if it is soluble in the solution polymerization system employed. Mercaptocarboxylic acids having 2 to 12 carbon atoms and containing one or two carboxyl groups in the molecule are suitable. Of these, monomercaptocarboxylic acids having 2 to 3 carbon atoms and containing one or two carboxyl groups in the molecule are particularly preferred. Examples of suitable monomercaptocarboxylic acids are thioglycolic acid, 2-mercaptopropionic acid, thiolactic acid, thiomalic acid, etc. Of these, thioglycolic acid is particularly preferred from the standpoint of solubility, economy, etc.

The amount of these mercaptocarboxylic acids used is limited to about 0.5 to about 20 parts by weight per 100 parts by weight of the monomers. If the amount is less than about 0.5 parts by weight, the polymer has an increased molecular weight and a reduced carboxyl content, so that the polymer does not form a thermoreversible solidified product if it is heated in the presence of a metal compound such as a metal oxide. If the amount is more than about 20 parts by weight, no appreciable decrease in the molecular weight of the resulting polymer in comparison with the amount of the mercaptocarboxylic acid added is obtained, and further, using such a large amount of mercaptocarboxylic acid is economically disadvantageous. A particularly preferred range is from 1 to 10 parts by weight of the mercaptocarboxylic acid per 100 parts by weight of the monomers.

The mercaptocarboxylic acid can be added all at once to the polymerization system in the early stage of polymerization or the mercaptocarboxylic acid may be added incrementally to the polymerization system at suitable points in time during the polymerization. It has been found that by adding the mercaptocarboxylic acid and the monomers incrementally to the polymerization system so as to provide a constant weight ratio of the amount of the mercaptocarboxylic acid to that of the monomers, various advantages result, such as ease in controlling the rate of polymerization, economical advantages due to an increase in the chain transfer efficiency of the mercaptocarboxylic acid and yield of the polymer obtained, and improved uniformity in the distribution of the molecular weight of the resulting polymer and of the terminal carboxyl groups. These advantages have been found experimentally that in the solution polymerization system of this invention, the rate of conversion of the monomers to the polymer nearly equals the rate of the mercaptocarboxylic acid being consumed under normal reaction conditions.

According to this invention, the monomers described above are solution polymerized in the presence of an organic solvent. Suitable organic solvents which can be used must be inert to the starting materials for the polymer and the reaction product obtained and must also be miscible with the mercaptocarboxylic acid.

For example, if thioglycolic acid is used as the mercaptocarboxylic acid, homogeneous solution polymerization can be achieved by using aromatic hydrocarbons such as benzene and toluene as a polymerization solvent. If thiomalic acid which is insoluble in such hydrocarbon solvents is used, then polar solvents such as isopropanol, acetone and dioxane may be appropriately employed as the organic solvent.

The liquid copolymer of this invention is viscous and it is rather difficult to completely remove the solvent from the polymeric solution. Therefore, a solvent having a boiling point of less than about 150° C. is preferably used.

Suitable organic solvents that can be used in this invention include aromatic hydrocarbons, aliphatic halogenated hydrocarbons, cyclic ethers, aliphatic alcohols, aliphatic ketones and aliphatic esters. Typical examples of suitable organic solvents include benzene, toluene, xylene, chloroform, carbon tetrachloride, tetrahydrofuran, dioxane, methanol, isopropanol, sec-butanol, acetone, methyl ethyl ketone, ethyl acetate, carbon disulfide, etc.

The amount of the organic solvent used in this invention is preferably from about 20 to about 150 parts by weight, and most preferably from 20 to 50 parts by weight, per 100 parts by weight of the total monomers. If the amount is less than about 20 parts by weight, it frequently becomes difficult to control the heat that is generated during the polymerization reaction. If the amount exceeds 150 parts by weight, not only the reaction rate but also the carboxyl group content in the resulting polymer tend also to decrease.

The most preferred method of polymerization is to introduce the monomers into the polymerization system in such a manner that the weight ratio of the amount of the organic solvent to the amount of the monomers always remains 2:1 or less. This is because in the radical solution polymerization system wherein the rate of polymerization of the monomers largely depends upon the concentration of the monomers within the system, a weight ratio that exceeds 2:1 results in an extremely low polymerization rate. In this invention, additional mercaptocarboxylic acid may be added in the course of the polymerization.

The polymerization reaction for producing the copolymer of this invention is accelerated by the usual free radical reaction mechanism, and so, naturally, conventional techniques of radical polymerizations, e.g., as disclosed in J. C. Bevington, *Radical Polymerization*, Academic Press Inc. (1961); and G. E. Ham, *Copolymerization*, Interscience (1964), concerning time, temperature and other reaction conditions, as well as selection of polymerization initiators can be used. Typical examples of polymerization initiators which can be used are azo compounds such as azo-bis-isobutyronitrile, 2,2'-azobis-(2,4-dimethylvaleronitrile), 2,2'-azobis-(4-methoxy-2,4-dimethylvaleronitrile), 2-phenylazo-2,4-dimethyl-4-methoxyvaleronitrile, 2-cyano-2-propyleneazoformaldehyde, etc.; peroxides such as benzoyl peroxide, lauroyl peroxide, p-chlorobenzyl peroxide, acetyl peroxide, etc.

The conventional method of polymerizing chloroprene monomers is generally emulsion polymerization under alkaline conditions. However, if this conventional method is employed in the polymerization system of this invention, the molecular weight of the resulting polymer cannot be easily controlled because the mercaptocarboxylic acid is itself denatured and the chain transfer efficiency of the mercaptocarboxylic acid is decreased significantly.

In the process of this invention, the polymerization is carried out at a temperature in the range from about 0° to about 100° C., and a particularly preferred temperature range is from 40° to 60° C. If the polymerization temperature is lower than about 0° C., the polymerization generally proceeds too slowly even if a polymerization initiator active at low temperatures is used. If the polymerization temperature is higher than about 100° C., it becomes difficult to control the polymerization.

A suitable degree of conversion of the monomers to the polymer is generally about 60 to about 80%, but a degree of conversion of about 90% or more can be obtained. The polymerization can be stopped at any desired point by either adding a conventional short-stop agent such as ter-butylcatechol or by cooling the polymerization system.

The resulting polymer can be isolated using known methods, but, for the purpose of recovering the unreacted monomers and the orgganic solvent, the reaction solution is preferably processed by an evaporator.

The liquid polymer obtained by this invention has a Broofield viscosity (measured at 25° C.) ranging from about 3,000 to about 3,000,000 cps and an inherent viscosity ($\eta$), as measured in toluene at 30° C., ranging from about 0.03 to about 0.25. The molecular weight of the polymer can be greatly altered by changing the kind and amount of mercaptocarboxylic acid employed, the ratio of the organic solvent to the monomers, polymerization temperature, etc. Suitable reaction conditions may be selected depending upon the end-use object of the polymer.

The polymer produced in this invention has a number average molecular weight ranging from about 500 to about 20,000 and has substantially at least one, and on the average 1 to 2.5, carboxyl groups in the molecule. Therefore, the molecular weight of the polymer can be increased by using known chemical carboxyl group reactions, for example, reactions with an epoxide or an isocyanate. Particularly, if the polymer is blended with a metal compound, not only does chelation take place between the carboxyl group and the metal compound to form a thermo-reversible solidified product but also the chloroprene polymer itself becomes vulcanizable with the metal compound.

Suitable compounds which can be used to form a chelate with the carboxyl group of the polymer of this invention are oxides and hydroxides of polyvalent metals such as magnesium, zinc, calcium, barium, cadmium or lead, and metal complex salts containing these metal oxides and these metal hydroxides. Representative examples of the metal complex salts which can be used in this invention include $ZnO$, $ZnCO_3$, transparent zinc white represented by the formula $ZnCO_3.Zn(OH)_2.H_2O$, and the like. Magnesium oxide and zinc oxide which easily form a chelate are particularly preferred. A chelate is also formed using hydroxides such as magnesium hydroxide and zinc hydroxide, but generally, they may be used only for limited applications because these hydroxides decompose upon heating to about 120° C. and liberate water.

The amount of the metal compound such as a metal oxide, a metal hydroxide or a metal complex salt used for chelate formation is at least about 1 part by weight, preferably from 5 to 20 parts by weight, per 100 parts by weight of the liquid chloroprene polymer. If the amount is less than about 1 part by weight, chelate formation is not sufficient to produce an elastomer composition.

The liquid chloroprene polymer according to this invention, if it is blended with the above described chelating agents, easily forms a chelate at a temperature of about 70° C. or less, for example, at a temperature ranging from room temperature to 70° C., and the entire polymer solidifies as the chelate formation proceeds. The higher is the temperature, the faster is the chelate formation. However, if the solidified blend is heated to a temperature higher than about 80° C., for example, a temperature of 100° to 120° C., the chelate breaks and the blend hot-melts and turns liquid.

Therefore, one of the most efficient methods for solidifying the liquid chloroprene polymer of this invention through chelate formation is to heat it to a temperature of 100° to 120° C., or a temperature of 100 to 150° C., and cool the thus heated polymer.

The rate of chelate formation is related to the molecular weight of the liquid polymer and the number of carboxyl groups. The general tendency is that, the lower the molecular weight is and the larger the number of carboxyl groups is, the faster the rate of chelate formation is.

The chelate generally breaks at a temperature higher than about 80° C., but this temperature slightly varies depending on the molecular weight of the liquid polymer and the number of carboxyl groups. For example, a liquid polymer having a number average molecular weight ranging from about 500 to about 4,000 most easily hot-melts at about 100° to 150° C. A polymer having a number average molecular weight ranging from about 4,000 to about 20,000 most easily hot-melts at about 100° to 200° C. However, as will be described hereinafter, excessive heating of a polymer having a relatively high molecular weight in the presence of a metal oxide results in heat-curing, and accordingly, care must be used if the specific purpose of heating the polymer is to hot-melt the polymer. For instance, a polymer having a number average molecular weight higher than about 4,000 is vulcanized and turned into a gel if the polymer is heated to an extent equivalent to or greater than 150° C. × 30 min, and therefore, it should be heated to a lesser extent, for example, high temperature and a short period such as in the range of 150° C. × 20 min.

The properties of the carboxyl group-containing liquid chloroprene polymer and the chelated polymer formed from oxides or hydroxides of polyvalent metals or metal complex salts containing these metal oxides or metal hydroxides according to this invention are influenced by the molecular weight of the liquid chloroprene polymer used, the carboxyl group content and the chelating agent used. The influence of the carboxyl group content in the liquid chloroprene polymer is particularly great. The number of carboxyl groups in the polymer molecule in this invention is substantially at least one, preferably about 1 to about 2.5. Bonding property, adhesiveness, sealing property, bendability and processability of the chelated polymer of this invention become excellent as the carboxyl group content decreases. In the case of using the chelated polymer for a bonding agent, an adhesive or a sealing material, it is preferred for the carboxyl group content to range from 1 to less than 1.5. On the other hand, the curing rate due to chelate formation increases as the carboxyl group content increases, but there is the disadvantage that the chelated polymer becomes hard and brittle, resulting in a deterioration of bendability and processability. Therefore, in the case of using the chelated polymer as a chelated polymer composition, it is preferred for the liquid chloroprene polymer to contain substantially at least one but less than 1.5 carboxyl groups in the molecule.

Heat curing of the liquid chloroprene polymer of this invention is described in greater detail below. Certain kinds of liquid chloroprene polymers of this invention undergo vulcanization or crosslinking, if they are heated in the form of a mixture with metal oxides such as magnesium oxide and zinc oxide. Of the liquid chloroprene polymers of this invention that have a number average molecular weight of about 500 to about 20,000, those polymers having a lower molecular weight are not substantially vulcanized, but those having a higher molecular weight are capable of being vulcanized with a metal compound. That is, substantially no vulcanized product is produced from polymers having a number average molecular weight lower than about 1,000 if these polymers are heated at 150° to 200° C. for several hours. Also substantially no vulcanized product is produced from those polymers having a number average molecular weight on the order of 1,000 to 4,000 if these polymers are heated in an amount equivalent to 150° C. × 3 hours, but they are partially gelled upon heating at 160° C. × 24 hours or more or 200° C. × 3 hours or more. Gelatinization of those polymers having a number average molecular weight higher than 4,000 occurs upon heating in an amount of heat equivalent to 150° C. × 30 min. or greater. In other words, at a temperature higher than 150° C., polymers having a number average molecular weight higher than 1,000 can be vulcanized and turned into a gel if they are heated sufficiently long. However, since production of a reactive hot-melt composition from the liquid chloroprene polymer of this invention requires rapid vulcanization, the most preferred polymer is one having a number average molecular weight higher than about 4,000, and in view of the fluidity of the hot-melting composition, not higher than 10,000.

Examples of metal oxides that can be used for heat-curing the liquid chloroprene polymer of this invention are oxides of polyvalent metals such as magnesium, zinc and lead, and magnesium oxide or zinc oxide is preferred. The amount of the metal oxide used ranges from about 1 to about 20 parts by weight based on 100 parts by weight of the liquid chloroprene polymer.

As described hereinbefore, the liquid chloroprene polymer according to this invention has more than one carboxyl group on the average per molecule, and if the liquid chloroprene polymer is a copolymer, additional functional groups can be present in the polymer depending on the kind of the copolymerizable monomer used. For instance, an unsaturated glycidyl ester can be used as the copolymerizable monomer to provide 0.5 to 2.5 epoxy groups on the average per molecule in addition to the more than one carboxyl group on the average per molecule. Use of a polyfunctional acrylate or methacrylate as the copolymerizable monomer provides acrylate or methacrylate groups in addition to the more than one carboxyl group on the average per molecule. The average number of the acrylate- or methacrylate-monomer units present in the copolymer is from about 0.5 to about 2.5, and the higher is the functionality of the acrylate- or methacrylate-monomer, the smaller is the number of acrylate- or methacrylate-monomer units that will be required. An unsaturated carboxylic acid as the copolymerizable monomer provides about 0.5 to about 2 additional carboxyl groups on the average per molecule to the more than one carboxyl groups on the average initially present, totalling 1.5 to 3 carboxyl groups on the average.

The polymers having these additional functional groups are very highly reactive because they have not only terminal carboxyl groups but also epoxy groups, (meth)acrylate groups or additional carboxyl groups as available reactive groups.

For instance, the epoxy groups are not only reactive with each other but they are also reactive with carboxyl compounds, amine compounds or isocyanate compounds. The (meth)acrylate group easily enters into an additional reaction with primary or secondary amines.

Therefore, polymers containing these additional functional groups have high compatibility and coreactivity with ordinary epoxy resins, and for this reason, they are good agents for rendering epoxy resins flexible such that they can advantageously be used in adhesives, paints and castings which are resistant to cracking. In addition, a polymer composition that contains a polyfunctional amine- or isocyanate-compound as a curing agent is self-curing, and therefore, such a composition can be used as a cold- or thermo-setting composition in applications such as adhesives, sealing materials, paints and moldings.

The liquid polymer obtained in this invention is capable of forming a thermo-reversible solidified product or a cross-linked cured product as described hereinbefore. Since either product retains rubbery characteristics, the polymer is useful not only as a substrate for castings, bonding agents, adhesives, sealing materials, coating materials and potting materials, etc. but also as a modifier for polymeric materials such as plastics or solid rubber. In fact, as compared with conventional chloroprene polymer, the liquid polymer of this inventions has a higher degree of compatibility and coreactivity with epoxy resins, phenol resins, etc. The heat reactivity described above which is peculiar to this liquid polymer also allows it to be used as a basic component of hotmelting compositions. In addition, the high weatherability and fire retardancy of the chloroprene polymer expands the scope of applications of this liquid polymer to include use as building materials and fire retardant materials.

If required in practical applications of the polymer of this invention, the polymer may be blended with ordinary compounding ingredients, for example, fillers such as titanium dioxide, calcium carbonate, silica, clay, and carbon black, petroleum lubricants, softening agents such as phthalic esters and tar, resins such as phenol resins, and cumarone-indene resins, bituminous material such as straight asphalt, blown asphalt and tar pitch, antioxidants such as hindered phenols, and solvents as viscosity modifiers.

Of the variety of applications of the liquid chloroprene polymer according to this invention, a bonding composition comprising about 10 to about 300 parts by weight, preferably 40 to 150 parts by weight, of polymer, about 1 to about 20 parts by weight, preferably 2 to 20 parts by weight, of a metal oxide, and 100 parts by weight of a resin that is miscible with the polymer can be used as a hot-melt adhesive. This compostion is particularly advantageous because it has a high bonding strength, has a high stability to gelation during handling, or heat ageing, and has a long tack retention time.

A liquid polymer having a number average molecular weight of from about 2,000 to about 8,000 is preferably used in preparing this bonding composition. The metal oxide can be selected from the materials described above that are capable of forming a chelate and causing the polymer to be heat-curable, and magnesium oxide, zinc oxide and metal complex salts containing these oxides are particularly advantageous. A resin having a softening point lower than about 50° C. provides a hot melt adhesive with inferior bonding strength, whereas a resin having a softening point higher than about 180° C. frequently provides a hot-melt adhesive with poor fluidity. It is therefore preferred to use resins having a softening point ranging from about 50° to about 180° C. Examples of preferred resins which can be used include the following:

(1) Cumarone-indene resins:

Copolymers of cumarone, indene and styrene, and resins mainly of cumarone and indene with the minor portion comprising a polycondensate of phenols and ketones.

(2) Phenolic and terpene resins:

p-tert-Butylphenol-acetylene resins, alkyl phenolic resins, phenol-formaldehyde resins, terpene phenolic resins, polyterpene resins, xylene-formaldehyde resins.

(3) Petroleum hydrocarbon resins:

Aromatic hydrocarbon resins, unsaturated hydrocarbon resins.

(4) Rosin resins:

Rosin esters, hydrogenated rosins, highly hydrogenated wood rosins, hydrogenated rosin esters, polymeric rosins, esters of polymeric rosin.

(5) Highly chlorinated products:

Thermoplastic chlorinated rubber, chlorinated polyethylene, 2,3-dichlrobutadiene-1,3 polymers.

This invention is illustrated below in greater detail by reference to the following examples and comparative examples. Unless otherwise indicated, all parts and percentages are by weight.

In these examples and comparative examples, the Brookfield viscosity, inherent viscosity, number average molecular weight, carboxyl group content and carboxyl group functionality were determined by the following methods, respectively.

1. Brookdfield viscosity was measured at 25° C.

2. Inherent viscosity ($\eta$) was measured in toluene at 30° C.

3. Number average molecular weight ($\overline{Mn}$) was measured with an ebulliometer.

4. Carboxyl group content is the ratio of the carboxyl content to the polymer expressed as a % by weight. The carboxyl group content was determined by dissolving the polymer in a solvent mixture of toluene and methyl ethyl ketone (1:4 by volume) and by titrating the resulting solution with a 0.05N methanol solution of potassium hydroxide using an automatic potentiometric titration apparatus.

5. Carboxyl group functionality is the number of carboxyl groups per molecular of the polymer. The carboxyl group functionality was determined in accordance with the following relationship:

$$\text{Functionality of carboxyl group} = \frac{\text{Carboxyl group content (\%)} \times \text{Number Average Molecular Weight}}{45}$$

EXAMPLE 1

A homogenous transparent solution of 100 parts of chloroprene, 24 parts of toluene and 5 parts of thioglycolic acid was charged into a reaction vessel equipped with a stirrer. After the temperature had been increased to 55° C., 1.5 parts of a toluene solution containing 0.5 parts of α,α'-azobis-2,4-dimethyl-valeronitrile were added to initiate polymerization. The polymerization was continued at the same temperature, and after 13 hours, 1 part of a toluene solution containing 0.02 parts of p-ter-butylcatechol was added to stop the polymerization. The degree of conversion of the chloroprene to the polymer was 73.5%. Then, a large excess of methanol was added to isolate the polymer, which was purified by dissolving the polymer in benzene and precipitation from methanol. This procedure of purification was repeated three times. Thereafter, the residual solvent was evaporated with a thin film evaporator at 110° C. under 1-2 mmHg abs. to isolate the polymer. The resulting polymer was a pale yellow transparent liquid.

Gas chromatographic analysis showed that the resulting polymer contained less than 0.1% residual solvent. Infrared absorption spectral analysis showed that the polymer had a strong characteristic absorption due to the terminal carboxyl group at 1725 cm$^{-1}$. The polymer had a Brookfield viscosity of 31,000 cps, an inherent viscosity ($\eta$) of 0.096, a number average molecular weight of 2,210, a carboxyl group content of 2.12%, and a carboxyl group functionality of 1.04. This polymer is hereinafter designated Polymer A.

EXAMPLE 2

After the temperature of a homogeneous solution of 50 parts of chloroprene, 25 parts of toluene and 2.5 parts of thioglycolic acid had been increased to 55° C., polymerization was initiated in the same manner as described in Example 1. When the conversion of the chloroprene to polymer had reached 50%, a homogeneous solution of 25 parts of chloroprene and 1.25 parts of thioglycolic acid was added. When a further 50% conversion of the chloroprene to polymer had been obtained based on the point in time of addition of the 25 parts of chloroprene, another solution of 25 parts of chloroprene and 1.25 parts of thioglycolic acid was added, and the polymerization was further continued until the conversion of chloroprene to polymer reached 50%, whereupon the reaction was stopped in the same manner as described in Example 1. The total polymerization time was 11.5 hours and the overall conversion of the chloroprene to the polymer was 75.0%. The reaction solution was treated in the same manner as in Example 1 to isolate the liquid polymer.

The polymer obtained was pale yellow and transparent, had a Brookfield viscosity of 15,500 cps, an inherent viscosity ($\eta$) of 0.076, a number average molecular weight of 2,040, a carboxyl group content of 2.55% and a carboxyl group functionality of 1.16. Comparison with Polymer A showed that the portionwise addition of the mixture of thioglycolic acid and the monomer to the polymerization system so that the ratio of the amount charged of the thioglycolic acid to that of the monomer was kept constant resulted in an increased carboxyl group content and reduced inherent viscosity ($\eta$) due to increased yield of the polymer as well as to increased chain transfer efficiency of the thioglycolic acid. The polymer obtained in Example 2 is designated Polymer B.

EXAMPLE 3

A plurality of polymers, Polymers C, D and E, were prepared using the same method as described in Example 2 except that the amount of thioglycolic acid added was varied. Table 1 shows the results of tests on curability of compositions of polymers blended with zinc oxide. All polymers prepared in Example 3 were pale yellow and transparent, and they had no smell.

Table 1

| Run No. | Polymer No. | Thio-glycolic[1] Acid (parts) | Polymerization Time (hr) | Resulting Polymer Brookfield Viscosity (cps) not less than | [$\eta$] | Carboxyl Group Content (%) | Number Average Molecular Weight | Carboxyl Group Functionality | Cura-[2] bility with ZnO |
|---|---|---|---|---|---|---|---|---|---|
| 1 | | 0.1 | 12.2 | 16,000,000 | 0.32 | 0.03 | 20,100 | 0.13 | A |
| 2 | Polymer C | 0.5 | 12.0 | 2,850,000 | 0.24 | 0.32 | 14,600 | 1.04 | B- |
| 3 | Polymer D | 3 | 11.6 | 29,900 | 0.171 | 1.11 | 4,330 | 1.07 | B- |
| 4 | | 7 | 11.7 | 12,000 | 0.065 | 2.43 | 1,910 | 1.03 | B |
| 5 | Polymer E | 15 | 11.0 | 4,800 | — | 6.60 | 760 | 1.11 | B |

As the results in Table 1 above show, with the addition of less than 0.5 parts of thioglycolic acid, the carboxyl group content was low and only a cross-linked cured product was obtained from the composition (blend of the polymer and zinc oxide) and a thermo-reversible solidified product was not formed. In Table 1, Run No. 1 was control.

Notes:

(1) Amount per 100 parts of monomer. A homogenous solution of the monomer prepared so as to provide a constant ratio of the amount of thioglycolic acid charged to that of the monomer was added in three portions.

(2) Curability Ratings:

A mixture of 100 parts of the polymer and 10 parts of zinc oxide was passed through a test paint mill three times and heated at 70° C. for 2 hours to produce a rubbery solidified product. The solidified product was then heated to 150° C. If the product turned into a gel and did not hot-melt, the product was rated A. If the product hot-melted, the product was rated B. If the product hot-melted and turned into a gel thereafter, the product was rated B-A. (The same ratings are used in the following examples.)

EXAMPLE 4

The same procedure as described in Run No. 3 of Example 3 was repeated except that 100 parts of chloroprene were replaced by a mixture of 90 parts of chloroprene and 10 parts of 2,3-dichlorobutadiene-1,3. The result was a pale yellow, transparent liquid copolymer. The copolymer had a Brookfield viscosity of 36,000 cps, a carboxyl group content of 1.69%, a number average molecular weight of 2,800, a carboxyl group functionality of 1.05, and an inherent viscosity ($\eta$) of 0.107. The copolymer obtained in Example 4 is designated Polymer F.

EXAMPLE 5

A liquid copolymer was obtained by following the same procedure as described in Example 3 except that 100 parts of chloroprene were replaced by a mixture of 90 parts of chloroprene and 10 parts of 2,3-dichlorobutandiene-1,3, thioglycolic acid was replaced by 5 parts of thiomalic acid, and toluene was replaced by isopropanol. The system became heterogeneous as the polymerization proceeded, but no serious problem was encountered in the polymerization. The copolymer obtained had a Brookfield viscosity of 48,000 cps, a carboxyl group content of 3.31%, a number average molecular weight of 2,790, a carboxyl group functionality of 2.05 and an inherent viscosity ($\eta$) of 0.112.

EXAMPLE 6

A liquid copolymer was obtained by following the same procedure as described in Example 3 except that 100 parts of chloroprene were replaced by a mixture of 90 parts of chloroprene, 6 parts of 2,3-dichlorobutadiene-1,3 and 4 parts of methacrylic acid, and 4 parts of thioglycolic acid were employed. The copolymer obtained had a Brookfield viscosity of 42,300 cps, a carboxyl group content of 3.17%, a number average molecular weight of 2,920, a carboxyl group functionality of 2.06 and an inherent viscosity ($\eta$) of 0.109. The copolymer obtained in Example 6 is designated Polymer G.

EXAMPLE 7

For the purpose of demonstrating the criticality of the amount of the solvent to be used, a variety of polymers were prepared by solution polymerization using varying amounts of toluene. Except for the amounts of toluene and thioglycolic acid, the same formulation and the same method of after-treatment as described in Example 1 were employed. Table 2 shows the results of the polymerization and characteristics of the resulting polymers. Run Nos. 6 and 10 were controls obtained by using a small amount of solvent and a large amount of solvent, respectively.

cules, the degree of introduction of terminal carboxyl groups into the resulting polymer is decreased.

EXAMPLE 8

A liquid polymer was prepared using the same procedure as described in Example 2 except that 5 parts of thioglycolic acid were replaced by 5 parts of 2-mercaptopropionic acid, and toluene was replaced by dioxane. The polymer obtained had a Brookfield viscosity of 17,500 cps, a carboxyl group content of 2.12%, a number average molecular weight of 2,210 and a carboxyl group functionality of 1.04.

REFERENCE EXAMPLE

Compounds were prepared from Polymers A, B, F, G and Polymer D obtained in Run No. 3 of Example 3 in accordance with the following compounding formulation:

| Compounding Formulation | parts |
|---|---|
| Copolymer | 100 |
| Zinc Oxide | 10 |
| SRF Carbon | 30 |

The compounds were press-cured at 100° C. for 2 hours to obtain rubbery elastomer sheets, and the thermo-reversibility and tensile characteristics were evaluated. The results obtained are set forth in Table 3 below.

Table 3

| Run No. | Polymer | Thermo-Reversibility* | Tensile Strength (kg/cm$^2$) | Elongation (%) | Hardness (JIS) |
|---|---|---|---|---|---|
| 11 | A | Yes | 7 | 1210 | 26 |
| 12 | B | Yes | 10 | 1030 | 24 |
| 13 | F | Yes | 12 | 1130 | 27 |
| 14 | G | Yes | 34 | 820 | 41 |
| 15 | D | No | 68 | 770 | 49 |

Note:
*"Yes" means that a cured sheet, allowed to stand in a Geer oven at 120° C. for 1 hour, hot-melted and become fluidic.

EXAMPLE 9

Four liquid polymers having different molecular

Table 2

| | | | | Results of Polymerization | | | Resulting Polymer | | | |
|---|---|---|---|---|---|---|---|---|---|---|
| Run No. | Toluene (parts) | Thioglycolic Acid (parts) | Polymerization Time (hr) | Conversion of Chloroprene to Polymer (%) | Temperature[1] Difference during Reaction (°C.) | Toluene/[2] Chlorprene Ratio (by wt) | Brookfield Viscosity (cps) | Carboxyl Group Content (%) | Number Average Molecular Weight | Carboxyl Group Functionality |
| 6 | 10 | 3 | 6.8 | 74.0 | 5.2 | 0.38 | 78,000 | 1.34 | 3,440 | 1.02 |
| 7 | 20 | 3 | 8.7 | 72.9 | 1.4 | 0.74 | 77,500 | 1.34 | 3,410 | 1.02 |
| 8 | 50 | 3 | 12.0 | 72.0 | 0.6 | 1.79 | 75,000 | 1.38 | 3,360 | 1.03 |
| 9 | 100 | 3 | 10.0 | 52.5 | 0.4 | 2.11 | 73,300 | 1.29 | 3,520 | 1.01 |
| 10 | 250 | 3 | 28.0 | 70.7 | 0.3 | 8.53 | 75,100 | 0.94 | 3,330 | 0.70 |

Notes:
[1]Temperature difference during polymerization is expressed by (maximum temperature reached) - (set temperature).
[2]Ratio of toluene/chloroprene in the polymerization system at the end of the polymerization.

As the results in Table 2 above show, if the amount of toluene is not within the range specified in this invention, either a large amount of heat is generated during the polymerization or, due to a decrease in the rate of polymerization and too great an increase in the degree of chain transfer reaction caused by the solvent molecules, weights that were prepared according to this invention were blended with metal oxides on a paint mill. The samples thus obtained were subjected to varied heat treatment condtions. Table 4 shows the ratings of each sample.

Table 4

| | Run Number | | | |
|---|---|---|---|---|
| | 16 | 17 | 18 | 19 |
| Polymer No. | E | B | D | C |
| Number Average Molecular Weight | 760 | 2,040 | 4,330 | 14,600 |
| Test Results | | | | |
| (I) State after Heated 150° C. × 3 hrs | Liquid | Liquid | Liquid | Solid elastomer |
| Brookfield Viscosity ($10^4$ cps at 150° C.) | 2.90 | 4.72 | 8.90 | Not measured |
| (II) State after Heated 150° C. × 3 hrs and cooled to room temp. | Tacky and semisolid | Solid elastomer | Solid elastomer | Solid elastomer |
| (III) State of Product (II) when Heated to 100° C. | Liquid | Liquid | First liquid, but viscosity gradually increased to become a gel | Did not melt |
| (IV) State after Heated 160° C. × 24 hrs | Liquid | First liquid, but viscosity gradually increased to become a gel | Solid elastomer | — |
| (V) State after Heated 200° C. × 3 hrs | Liquid | Solid elastomer | Solid elastomer | — |
| (VI) State of Product (IV) when Heated to 150° C. | Liquid | Did not melt | Did not melt | — |

Note: Formulation Employed
Polymer 100 (parts)
ZnO 10

As the results in Table 4 above show, each of the liquid chloroprene polymers having carboxyl groups according to this invention was capable of forming a chelate, and the chelated product obtained, although it hot-melted, was either thermo-reversible or heat-curable depending upon the molecular weight.

EXAMPLE 10

Three compounds were prepared by blending 100 parts of Polymer B with 5 parts each of zinc oxide and magnesium oxide on a paint mill. The samples thus prepared were maintained at 20° C., 50° C. and 100° C., respectively, and time-dependent change of the Brookfield viscosity of each sample was measured. The results obtained are set forth in Table 5. To examine the heat resistance of a solid elastomer obtained by heating one of the samples at 100° C. for 24 hours and cooling the same, cubic test pieces were maintained in a Geer oven for 24 hours at 70° C., 80° C. and 100° C. The results obtained are also shown in Table 5.

Table 5

| | Sample No. | | |
|---|---|---|---|
| | 20 | 21 | 22 |
| Temperature (°C.) | 20 | 50 | 100 |
| Time (hr) Time-Dependent Change of Viscosity ($10^4$ cps) | | | |
| 1 | 7.14 | 55.2 | 23.7 |
| 5 | 7.90 | 70.0 | 34.0 |
| 10 | 19.2 | 144 | 39.5 |
| 24 | 160 | 712 | 41.3 |
| 48 | 380 | 1,000 | 60.8 |
| 96 | 590 | 1,000 | 64.2 |
| Heat Resistance | | | |
| 70° C. | | | No part lost shape |
| 80° C. | | | Slight loss of shape occurred on the surface |
| 100° C. | | | Melted and become liquid |

As can be readily understood from the results in Table 5 above, the polymer obtained according to this invention formed a chelate with a metal oxide to significantly increase the compound viscosity, chelate formation occurred much faster at 50° C. than at room temperature, and the chelate formed broke at a relatively high temperature of 80° to 100° C.

EXAMPLE 11

A liquid copolymer was obtained in accordance with the same procedure as described in Example 3 except that 100 parts of chloroprene were replaced by a mixture of 90 parts of chloroprene, 6 parts of 2,3-dichlorobutadiene-1,3 and 4 parts of 1,1,1-trimethylolpropane trimethacrylate, and 3 parts of thioglycolic acid were employed. The copolymer obtained had a Brookfield viscosity of 82,000 cps, a carboxyl group content of 2.04%, a number average molecular weight of 2,880, and a carboxyl group functionality of 1.31.

A compound of 100 parts of this copolymer and 5 to 10 parts of zinc oxide or magnesium oxide easily formed a chelate product to provide a solid elastomer when the compound was left to stand at room temperature. This copolymer was also confirmed to have high compatibility and cocurability with ordinary liquid epoxy resins.

EXAMPLE 12

A liquid copolymer was obtained using the same procedure as described in Example 3 except that 100 parts of chloroprene was replaced by a mixture of 90 parts of chloroprene, 4 parts of 2,3-dichlorobutadiene-1,3 and 6 parts of glycidyl methacrylate, and 5 parts of thioglycolic acid was employed. The copolymer obtained has a Brookfield viscosity of 47,600 cps, a carboxyl group content of 2.40%, an epoxy group content of 2.10%, a number average molecular weight of 1,980 and carboxyl and epoxy group functionalities of 1.06 and 0.97, repectively.

A compound of 100 parts of this copolymer and 5 to 10 parts of zinc oxide or magnesium oxide easily formed a chelate product to provide a solid elastomer when the compound was left to stand at room temperature. This copolymer was also confirmed to have high compatibility and cocurability with ordinary liquid epoxy resins.

REFERENCE EXAMPLE (Bonding agent composition)

The performance of a combination of Polymer D with a tackifier resin as a hot-melt bonding agent was evaluated. A mixture of 100 parts of a tackifier, i.e. a cumarone-indene resin having a softening point of 101° to 110° C., 50 parts of Polymer D, 5 parts of zinc oxide and 4 parts of magnesium oxide each as a metal oxide was intimately blended on a paint mill. The blend was charged into a mold (1 mm thick) and heated at 150° C. for 30 minutes to provide a flexible film. This filmy bonding agent was contact-bonded to a canvas adherend with a heated trowel. After 30 minutes, the bonding agent had a peeling strength of 12.4 kg/2.5 cm. With a steel plate as an adherend, the bonding agent had adhesive strength under shear of 32.0 kg/cm$^2$.

While the invention has been described in detail and with reference to specific embodiments thereof, it will be apparent to one skilled in the art that various changes and modifications can be made therein without departing from the spirit and scope thereof.

What is claimed is:

1. A thermo-reversible elastomer composition comprising 100 parts by weight of a liquid chloroprene polymer having a Brookfield viscosity (measured at 25° C.) ranging from about 3,000 to about 3,000,000 cps containing at least one carboxyl group in the molecule and having a number average molecular weight of from about 500 to about 20,000 and at least 1 part by weight of a metal compound which is a polyvalent metal oxide or hydroxide or a metal salt complex comprising a polyvalent metal oxide or hydroxide, said liquid chloroprene polymer having been prepared by (1) homopolymerizing a chloroprene monomer or (2) copolymerizing a chloroprene monomer with a monomer copolymerizable with the chloroprene monomer, in the presence of an organic solvent having a boiling point of less than about 150° C. at atmospheric pressure which is miscible with a mercapto-carboxylic acid and is selected from the group consisting of aromatic hydrocarbons, aliphatic halogenated hydrocarbons, cyclic ethers, aliphatic alcohols, aliphatic ketones and aliphatic esters and 0.5 to 20 parts by weight of a mercaptocarboxylic acid per 100 parts by weight of the monomers.

2. The thermo-reversible elastomer composition of claim 1, wherein the metal compound is present in an amount of 1 to 20 parts by weight.

3. The thermo-reversible elastomer composition of claim 2, wherein the polyvalent metal oxide is magnesium oxide or zinc oxide.

4. The thermo-reversible elastomer composition of claim 1, wherein the number average molecular weight is from about 500 to about 4,000.

5. The thermo-reversible elastomer composition of claim 1, wherein the number average molecular weight is from about 4,000 to about 20,000.

6. The thermo-reversible elastomer composition of claim 1, wherein the number of carboxyl groups is from 1 to less than 1.5.

7. The thermo-reversible elastomer composition of claim 1, wherein the number average molecular weight is from about 4,000 to about 20,000 and the polyvalent metal oxide is magnesium oxide or zinc oxide, and the composition is heat-curable.

8. The thermo-reversible elastomer composition of claim 1, wherein said monomer copolymerizable with the chloroprene monomer has an $$H_2C=C{\Large\langle}$$

group.

9. The thermo-reversible elastomer composition of claim 8, wherein said monomer copolymerizable with the chloroprene monomer is selected from the group consisting of styrene, styrene derivatives, vinylpyridine, vinylpyridine derivatives, acrylic acid esters, methyacrylic acid esters, unsaturated carboxylic acids, unsaturated nitriles and conjugated dienes.

10. The thermo-reversible elastomer composition of claim 9, wherein said monomer copolymerizable with the chloroprene monomer is selected from the group consisting of 2-, 3-or 4-chlorostyrene, 2-, 3- or 4-bromostyrene, 3-chloro-2-methylstyrene, 2,3-dichlorostyrene, 2,4-dimethylstyrene, 2-, 3- or 4-methoxystyrene and 2-, 3- or 4-ethoxystyrene.

11. The thermo-reversible elastomer composition of claim 9, wherein said monomer copolymerizable with the chloroprene monomer is selected from the group consisting of 2-, 3-or 4-vinylpyridine, 5-ethylene-2-vinylpyridine and 2-methyl-5-vinylpyridine.

12. The thermo-reversible elastomer composition of claim 9, wherein said monomer copolymerizable with the chloroprene monomer is selected from the group consisting of methyl methacrylate, ethyl methacrylate, methyl acrylate, ethyl acrylate, butyl acrylate and butyl methacrylate.

13. The thermo-reversible elastomer composition of claim 9, wherein said monomer copolymerizable with the chloroprene monomer is selected from the group consisting of isoprene, butadiene-1,3, 2,3-dimethylbutadiene, 1-chlorobutadiene-1,3, 2,3-dichlorobutadiene-1,3, 2-bromobutadiene-1,3, 2-fluorobutadiene-1,3, 2-cyanobutadiene-1,3, 2-phenylbutadiene-1,3, and 2-chloro-3-methylbutadiene-1,3.

14. The thermo-reversible elastomer composition of claim 9, wherein said monomer copolymerizable with the chloroprene monomer is acrylonitrile.

15. The thermo-reversible elastomer composition of claim 1, wherein the polyvalent metal hydroxide is present in an amount of 1 to 20 parts by weight.

16. The thermo-reversible elastomer composition of claim 1, wherein the metal salt complex is present in an amount of 1 to 20 parts by weight.

* * * * *